United States Patent [19]

Ishii et al.

[11] Patent Number: 5,154,967
[45] Date of Patent: Oct. 13, 1992

[54] COMPOSITE FILM AND PREPARATION THEREOF

[75] Inventors: Keizou Ishii, Ashiya; Teruaki Kuwajima, Higashiosaka; Hiroshi Miwa, Itami; Akio Kashihara, Hirakata; Shinichi Ishikura, Kyoto, all of Japan

[73] Assignee: Nippon Paint Co., Ltd., Osaka, Japan

[21] Appl. No.: 668,811

[22] Filed: Mar. 8, 1991

Related U.S. Application Data

[63] Continuation of Ser. No. 313,355, Feb. 17, 1989, abandoned, which is a continuation of Ser. No. 879,586, Jun. 27, 1986, abandoned, which is a continuation-in-part of Ser. No. 652,677, Sep. 19, 1984, abandoned.

[51] Int. Cl.$^5$ .................. D03D 25/00; D04H 5/04
[52] U.S. Cl. .................. 428/279; 428/224; 428/267; 428/290; 428/291; 428/413; 428/423.5; 428/502
[58] Field of Search .............. 428/279, 267, 224, 272, 428/290, 291, 413, 423.5, 502

[56] References Cited

FOREIGN PATENT DOCUMENTS 2061965A 5/1981 United Kingdom ................ 428/279

Primary Examiner—Jacob Ziegler
Attorney, Agent, or Firm—Wenderoth, Lind & Ponack

[57] ABSTRACT

Novel composite resinous film comprising a continuous phase of at least one resin and a discontinuous phase of microdomains which are aggregates of particles of at least one insoluble resin and are 0.03 to 10 microns in size, is provided. The film can exhibit the most desirous properties of the respective, constituent resinous materials and are useful in various fields including the paint industry.

1 Claim, No Drawings

COMPOSITE FILM AND PREPARATION THEREOF

This application is a continuation of now abandoned application Ser. No. 07/313,355, filed Feb. 17, 1989 which is a continuation of abandoned application Ser. No. 06/879,586, filed Jun. 27, 1986 which is a continuation-in-part of abandoned application Ser. No. 06/652,677 filed Sep. 19, 1984.

FIELD OF INVENTION

The present invention relates to a novel composite film and preparation thereof.

BACKGROUND OF THE INVENTION

Continuous films of natural or synthetic resins are widely used in various fields including photography, printing, textile, paint industries or the like. Heretofore, such resinous films have been made as uniform, continuous films, whose properties and functions are regulated by the film constituting resin itself. Therefore, a number of synthetic high molecular compounds have been developed in answer to disverse needs. However, there is a limit to finding novel high molecular compounds due to the restrictions in natural resources, development costs, environmental pollution and the like.

On the other hand, from the viewpoint of diversification and advancement in requirements, various properties and functions are concurrently required in a single film material. This is almost impossible for the existing resinous materials.

Under the circumstances, attempts have been naturally made to use combinations of different resinous materials. For example, in the coating composition area, there have been developed solution type, emulsion type or powder type compositions containing as resinous vehicle two and more different type of resins and also a technique of using a combination of soluble resin and insoluble resinous particles. When applied, these compositions will give either one of the following coating structures. That is, one is a thoroughly melted uniform film and the other is heterogeneous film comprising a continuous phase of melted resins and a discontinuous phase of insoluble resinous particles uniformly and finely dispersed in said continous phase. The matter need occasion no surprise because what was borne in mind was how to obtain a uniform film by all means.

According to the heretofore proposed techniques, it was, however, not possible to attain a film with improved properties of both constituent resins. That is, in the case of either uniformly melted films or heterogenous structure films, it was, not possible, as is well known in the art, to get the composite excellent properties of the respective resins. In such case, the final product shows cumulative inferior properties of these resins. For example, for the purpose of obtaining a product having improved tensile strength and elongation properties, even when a resin which has good tensile strength but poor elongation is used with B resin which is soft but has good elongation, it is not possible to obtain a product having expected properties and the resultant product is soft and of inferior elongation characteristics.

Therefore, the appearance of improved resinous films with each conflicting but desirable property such as tensile strength and elongation, water resistance and anticorrosive property, appearance and good film performance, and the like, which had never been attained with heretofore proposed uniform films and heterogeneous films has long been desired. Now, the inventors have found that when a second resin exists in the form of certain size of mass as discontinous phase, in a continous phase of first resin, desired properties of the said two resins will come out in thus obtained composite film, that the said mass may take either form of fused aggregate, unfused aggregate or crosslinked mass of fine particles, and that such composite film may be easily produced by using a resinous composition containing in a liquid medium, soluble resin, insoluble resinous particles and certain organic compound capable of promoting the formation of such aggregated mass of the insoluble resinous particles, hereinafter called as microdomain. On the basis of these findings, the present invention has been made.

SUMMARY OF THE INVENTION

According to the invention, there is provided a composite film comprising a continuous phase of at least one film-forming resin and a discontinuous phase of microdomains which are 0.03 to 10 micron in size and are aggregates of particles of at least one insoluble resin.

The invention also provides a method for making a composite film comprising a continuous phase of at least one film-forming resin and a discontinous phase of microdomains which are 0.03 to 10 micron in size and are aggregates of particles of at least one insoluble resin, which is characterized by that a resinous composition consisting essentially of (a) a liquid medium, (b) at least one resin which is soluble in said liquid medium and capable of forming a continuous film, (c) particles of at least one resin which is insoluble in the combination of said (a) and said (b), and (d) a microdomain forming agent herein defined, the weight ratio of said (b), (c) and (d) being 100:0.1-100:0.01-30, is applied onto a substrate and the composite is subjected to drying, baking or both baking and drying.

In the present composite film, at least two different types of resins are involved.

The first type of resin is characterized by the nature which is soluble in a selected liquid medium and capable of forming a continuous film phase. Such resin may be any of the aqueous or oil borne binder resins customarily used as film-forming resins in the coating composition area. Examples of such binder resins are natural oil, oil-free polyester resin, alkyd resin, unsaturated polyester resin, acryl resin, vinyl resin, epoxy resin, aminoplast resin, urethane resin and the like.

One or more than 2 of the abovesaid compatible resins are satisfactorily used.

Another type of resin used in the form of particles is characterized by the nature that it is insoluble in the combination of the selected liquid medium and the aforesaid film-forming resin, and is capable of forming a discontinuous phase in the composite film.

In the present invention, these resin particles may form aggregates at the film-forming stage by the help of a microdomain forming agent and exist as a discontinuous microdomain phase in the final composite film.

Such resin particles may be composed of any of the resins already mentioned in connection with the first type of resin and however, particularly preferable members are the resins obtained by polymerization or copolymerization of $\alpha,\beta$-ethylenically unsaturated monomers.

Since these resins are to be formed in an aggregate mass (microdomain) of fine particles, they should be used as fine particles. Preparation of such particles may be advantageously carried out by using emulsion polymerization, suspension polymerization, NAD polymerization or solution polymerization technique, in a conventional way.

Usually, the continuous phase-forming resin is applied as an aqueous or solvent solution, and therefore the abovesaid microdomain forming resin should be insoluble in the combination of such liquid medium and the aforesaid soluble resin.

In a resinous composition system, the microdomain forming resin should preferably be provided as crosslinked, insoluble, resinous particles.

Particularly preferable, crosslinked resinous particles are of the type stabilized by zwitter groups. Such particles and their preparation are stated, for example, in Japanese Patent Kokai Nos. 80386/77; 80387/77; 282/78; 69554/80; 21927/82; 40504/82; 139111/82; 187301/82; 187302/82; 129066/83; 129069/83.

The aggregation mass of such resinous particles may be, as already stated, either one of fused mass, unfused mass or interparticle crosslinked mass, and however, should be of the size ranging from 0.03 to 10 micron. This is because, if the microdomain size is less than 0.03 micron, it is unable to obtain the desired properties of the discontinuous phase resin and if the microdomain size is over 10 micron, it is unable to provide a composite film with an acceptable film appearance.

The present composite film has a unique film structure which has never been known in the art and is capable of developing desired properties of the respective, constituent resins in full. Thus, the invention can provide a resinous composite film having the characteristic properties which are believed to be conflicting with each other as, for example, good appearance and film performance, tensile strength and elongation, water resistance and anticorrosive property or the like, and hence cannot be attained with the existing uniform and heterogeneous films.

This invention is, therefore, applicable to a wide variety of technical fields, besides the coating composition area, as, for example, photographic material, printing material, plastics, medical, textile and the like.

Though the invention can never be limited to a particular method for the preparation of the present composite film, the inventors have found that the composite film in question can be easily and advantageously obtained by the following method. That is, a resinous composition consisting essentially of
(a) a liquid medium
(b) at least one resin which is soluble in said liquid medium and capable of forming a continuous film,
(c) particles of at least one resin which is insoluble in the combination of said (a) and said (b) and capable of forming discontinuous microdomain phase, and
(d) a microdomain forming agent, the weight ratio of (b), (c) and (d) being 100:0.1-100:0.01-30 and the microdomain forming agent being an organic compound fulfilling the requirements $$R \geq 160$$

at least one $In \geq 70$ $$\Sigma In/R \geq 0.5$$

wherein R represents a quantity of organic characters, In is a quantity of inorganic characters of inorganic group No. n, and n is an integer of 1 and more and corresponds to the number of inorganic groups in the molecule, is applied onto a substrate and the composite is subjected to drying, baking or both baking and drying, according to normal procedures, to obtain a composite film comprising a continuous phase of (b) resin and discontinuous phase of microdomain (0.03 to 10 micron size aggregate mass) of (c) insoluble resin.

From the standpoint of the stability of resinous composition per se, application easiness and the like, it is preferred that the resinous particles are of the size less than 0.1 micron and the weight ratio of said (b) resin, (c) resin particles and (d) compound is 100:0.1-100:0.01-30. If the amount of said resinous particles is less than 0.1% by weight of the soluble resin, the characteristic properties of the present composite film can never be attained in full.

The microdomain forming agent used in the present invention is an organic compound characterized by the quantity of organic characters and the ratio of total quantity of inorganic characters to quantity of organic characters and by the presence of particular inorganic groups.

The inventors have found that when a film is formed from a resinous composition containing insoluble resinous particles, in the presence of certain organic compounds, said resinous particles are aggregated together, thereby forming masses in a continuous resin phase and that the aggregation power for forming such masses may vary from compound to compound. The inventors have also found that organic compounds which are capable of forming microdomain of an optimum size of 0.03 to 10 micron from resinous microparticles (less than 0.1 micron size) can be defined by the parameters of quantity of organic characters, ratio of the quantity of inorganic characters to that of organic characters, as well as the presence of particular inorganic groups in the molecules.

According to A. Fujita, Pharmaceutical Bulletin Vol.2, No.2, 163 (1954) and Kagaku no Ryoiki, Vol.11, No.10, 719 (1957), the nature of the organic compounds are said to be determined by the factor "organic characters" of hydrocarbon which is the cumulative effect of covalent bondings, and by the factor "inorganic characters" which is the static effect of the existing substituents. These factors are then expressed in numerical values by taking the multiple proportion of the FIG. 20 given to a methylene group for organic characters and by making comparison with the FIG. 100 given to the affecting power of the hydroxyl group on the boiling point for inorganic characters, and these values are plotted in a Conceptional Diagram, the horizontal axis of which being a quantity of organic characters and the perpendicular axis a quantity inorganic characters.

A. Fujita has proposed to make predictions on the natures of organic compounds from the locating position of the compounds in such a conceptional diagram.

Based on the abovesaid analytical method, the inventors have analyzed the effective microdomain forming agents and found that they are compounds fulfilling the requirements that (1) quantity of organic characters is 160 and more
(2) ratio of the total quantity of inorganic characters to that of organic characters is 0.5 and more (3) at least one inorganic group must have the quantity of inorganic characters of 70 and more.

Examples of inorganic groups having the quantity of inorganic characters of 70 and more are light metal salts (≧500); heavy metal salts, amines and NH₃ salts (≧400); —ASO₃H₂, >ASO₂H (300); —SO₂—NH—CO—, —N=N—NH₂ (260);

$$\diagdown_{\diagup}N-OH,$$

—SO₃H, —NH—SO₂—NH— (250); —CO—NH—CO—NH—CO— (250);

$$\diagdown_{\diagup}S-OH,$$

—CO—NH—CO—NH— (240); —SO₂—NH— (240); —CS—NH—, —CO—NH—CO— (230); =N—OH, —NH—CO—NH— (220); =N—NH— (210); —CO—NH— (200); —COOH (150); lactone ring (120); —CO—O—CO— (110); anthracene nucleus, phenanthrene nucleus (150); —OH (100); >Hg (95); —NH—NH—, —O—CO—O— (80); —N< (amines) (70) and the like.

The said organic compound may further include other inorganic groups as >CO, —COOR, naphthalene nucleus, quinoline nucleus, >C=NH, —N=N—, —O—, aromatic mononucleus, triple bonding, double bonding, >SO₂ and the like, providing that at least one of the aforesaid group has a quantity of inorganic characters of 70 and more.

The inventors have found that 0.03 to 10 micron size microdomain can never be obtained in the presence of an organic compound whose characteristics are outside the abovesaid requirements (1), (2) and (3).

More specifically, the employable microdomain forming agents are classified in either one of the following.

(A) Various resins having at least one inorganic group whose inorganic value is 70 and more, as, for example, polymerization or condensation type resins prepared by using monomers with the abovesaid inorganic group, modified epoxy resin, urethane resin, silicon resin, fluorine resin with said inorganic group.

Such microdomain forming agent is usually employed in an amount of 10 to 30% by weight of the total resinous particles. Excessive amounts, especially in the case of low molecular weight compounds, should be avoided because of giving undesired effects on the composite film, and the minimum effective amount should preferably be used.

As already stated, the present composite film may be used in various fields and however, is especially useful in the paint industry. This is because, the invention can provide a resinous film having hard and elastic properties, and having water resistance and anticorrosive properties. When applied in the paint area, the present resinous composition and may include conventional pigments, including body pigments, inorganic pigments of white, black, red, gray, brown, yellow, green, blue and violet color, metal powder, and organic pigments of yellow, red, blue, green, violet color and the like (B) Anionic, cationic, amphoteric or nonionic surfactant bearing said inorganic group (C) organometallic salt,
organo arsenic compound,
hydroxylamine compound,
organo sulfonic acid compound,
organo sulfonic amide compound,
amide compound,
thioamide compound,
urea derivative,
enamine compound,
carboxylic acid compound,
lactone compound,
carbonate compound,
aromatic compound,
hydroxyl compound,
acid anhydride,
amine compound,
and the like.

The invention shall be now more fully explained in the following Examples. Unless otherwise being stated, all parts and percentage are by weight.

REFERENCE EXAMPLE 1

Preparation of Acrylic Resin Varnish

Into a reaction vessel fitted with stirrer, thermoregulator and reflux condenser, were placed 710 parts of toluene and 200 parts of n-butanol. Next, 200 parts of the monomer solution having the following composition were added and the mixture was heated under stirring to raise the temperature.

| | |
|---|---|
| methacrylic acid | 12 parts |
| styrene | 264 |
| methyl methacrylate | 264 |
| N-buthyl acrylate | 360 |
| 2-hydroxy ethyl acrylate | 100 |
| azobisisobutyronitrile | 20 |
| n-dodecyl mercaptan | 20 |
| Total | 1040 |

While keeping refluxing, the remaining 810 parts of the monomer solution were dropwise added in 2 hours and then were dropped in a solution of 3 parts of azobisisobutyronitrile and 100 parts of toluene in 30 minutes. Thereafter, the mixture was refluxed for additional 2 hours under stirring, and the reaction was stopped to obtain an acrylic resin varnish having a nonvolatile content of 50%. Number average molecular weight of the resin was 3800.

REFERENCE EXAMPLE 2

Preparation of Alkyd Resin Varnish

Into a reaction vessel fitted with stirrer, thermoregulator and decanter, were placed the following.

| | |
|---|---|
| dehydrated castor oil | 260 parts |
| coconut oil | 192 |
| trimethylol propane | 403 |
| diethylene glycol | 65 |
| phthalic anhydride | 578 |
| xylene | 45 parts |

The mixture was heated under stirring, formed water was removed azeotropically with xylene, heating was continued until hydroxyl number of 100 and the reaction was stopped at that stage.

The thus obtained resinous solution was diluted with xylene to a non-volatile content of 70% to obtain an alkyd resin varnish, Gardner viscosity was Z.

REFERENCE EXAMPLE 3

Preparation of Aqueous Acrylic Resin Varnish

Into a 1 liter reaction vessel fitted with stirrer, thermoregulator and condenser, were placed 76 parts of ethyleneglycol monobutyl ether and to this was added 61 parts of a monomer solution comprising 45 parts of styrene, 63 parts of methyl methacrylate, 48 parts of 2-hydroxyethyl methacrylate, 117 parts of n-butyl acrylate, 27 parts of methacrylic acid, 3 parts of laurylmercaptan and 3 parts of azobisisobutyronitrile.

The mixture was then heated under stirring to 120° C. and the remaining 245 parts of the abovesaid monomer solution were added dropwise in 3 hours and the mixture was stirred for 1 hour. To this, were added 28 parts of dimethyl ethanolamine and 200 parts of deionized water to obtain an acrylic resin varnish having a non-volatile content of 50%. Number average molecular weight of the resin was 6000.

REFERENCE EXAMPLE 4

Preparation of Aqueous Alkyd Resin Varnish

Into a 2 liter glass reaction vessel fitted with stirrer, thermoregulator and decanter, were placed 420 parts of safflower oil, 254 parts of neopentylglycol, 6 parts of trimethylolethane, 120 parts of phthalic anhydride, 240 parts of trimellitic anhydride, and 25 parts of xylene and the mixture was heated under stirring. While maintaining the temperature at 190° to 210° C., and removing the formed water azeotropically, the reaction was continued for 5 hours, to obtain an alkyd resin having an acid value of 56, OH value of 40, number average molecular weight of 1600 and oil length of 40.

Next, the resin solution was diluted with 190 parts of ethyleneglycol monobutyl ether and 95 parts of isopropanol, and neutralized with 89 parts of dimethyl ethanolamine and added with 601 parts of deionized water to obtain an aqueous varnish having a non-volatile content of 50%.

REFERENCE EXAMPLE 5

Preparation of Resinous Particles No. 1

Into a reaction vessel fitted with stirrer and thermoregulator, were placed 216 parts of deionized water and while maintaining the temperature at 80° C. under stirring, a mixture of 4.5 parts of azobiscyanovaleric acid, 4.28 parts of dimethyl ethanol amine and 45 parts of deionized water was added. Next, at the same temperature, a first solution of 6 parts of N,N-dimethyl-N-(3-sulfopropyl)-N-methacryl oxyethyl-ammonium betaine, 6 parts of 2-hydroxyethyl acrylate and 90 parts of deionized water, and a second solution of 84 parts of methyl methacrylate, 103 parts of n-butylacrylate, 77 parts of styrene and 24 parts of 2-hydroxy ethyl acrylate were simultaneously and dropwise added in 60 minutes. After completion of said addition, a mixed solution of 1.5 parts of azobiscyanovaleric acid, 1.42 parts of dimethyl ethanol amine and 1.5 parts of deionized water was added at the same temperature and the mixture was stirred for 60 minutes to obtain an emulsion having a nonvolatile content of 45%, and being a mono dispersion of grain size 0.116 micron. By subjecting to a spray-drying, powdery resinous particles were obtained.

REFERENCE EXAMPLE 6

Preparation of Resinous Particles No.2

Into the similar reaction vessel as used in Reference Example 5, were weighed 900 parts of deionized water, 1.5 parts of Metholose 60 SH-50 (methlcellulose, manufactured by Shinetsu Kagaku K.K.), 200 parts of methyl methacrylate, 66 parts of 2-ethyl hexyl acrylate, 15 parts of methacrylic acid, 25 parts of glycidyl methacrylate, and 6 parts of azobisisobutyronitrile. The mixture was heated to 65° C. while stirring at 250 rpm and the same temperature was maintained for 7 hours to finish the reaction. Thus obtained suspension was filtered through 200 mesh shieve to obtain peal particles of 20 to 600 micron size.

The particles were then pulverized in ball mill for 48 hours to obtain resinous particles of a mean grain diameter of 4.5 micron.

REFERENCE EXAMPLE 7

Preparation of Resinous Particles No.3

Preparation of modified epoxy resin

Into a 2 liter flask fitted with stirrer, condenser and thermoregulator, were placed 73.5 parts of sodium salt of taurine, 100 parts of ethylene glycol and 200 parts of ethylene glycol monoethyl ether, and the mixture was, under stirring, heated to 120° C.

After reaching the thoroughly melted state, a solution of 470 parts of Epicoat 1001 (bisphenol A diglycidyl ether type epoxy resin, manufactured by Shell Chem. Co., epoxy equivalent 470) and 400 parts of ethylene glycol monoethyl ether was dropwise added in 2 hours.

After completion of said addition, stirring and heating were continued for 20 hours to stop the reaction. The reaction mixture was acidified with hydrochloric acid, the precipitated crystals were filtered and purified by repeating precipitation from ethyleneglycol monoethyl ether and water, and the product was dried under reduced pressure to obtain 205 parts of modified epoxy resin.

This resin showed and acid value (determined by KOH titration) of 48.6 and sulfur content (determined by fluorescent X ray analysis) of 3%.

The quantity of organic characters was 1280 and the total quantity of inorganic characters was 1250. As the inorganic groups having the quantity of inorganic characters of 70 and more, the resin included $-SO_3H$, $-OH$ and $>NH$ groups. Besides the same, the resin had $-O-$ and aromatic ring (benzene) each having a quantity of inorganic characters of less than 70.

Preparation of resinous particles

Into a 1 liter reaction vessel fitted with stirrer, condenser, and thermoregulator, were placed 306 parts of deionized water, 45 parts of the abovesaid modified epoxy resin and 6 parts of dimethyl ethanol amine and the mixture was, under stirring, heated and melted at 80° C.

While maintaining the temperature at 80° C. and continuing stirring, a mixed solution of 4.8 parts of azobiscyanovaleric acid, 4.56 parts of dimethyl ethanol amine and 48 parts of deionized water was added and then a mixed solution of 67 parts of styrene, 73 parts of methyl methacrylate, 85 parts of n-butyl acrylate and 30 parts of 2-hydroxyethylacrylate was dropped in over 150 minutes.

Thereafter, a mixed solution of 1.2 parts of azobiscyanovaleric acid, 1.14 parts of dimethyl ethanol amine and 12 parts of deionized water was added at the same temperature and the mixture was stirred for 60 minutes to obtain an emulsion having a non-volatile content of 45%, pH of 7.2 and viscosity (25° C.) of 72 cps and containing resinous particles whose mean diameter was 0.040 micron.

REFERENCE EXAMPLE 8

Preparation of Resinous Particles No.4

Preparation of polyester resin

Into a 2 liter flask fitted with stirrer, nitrogen gas inlet, thermoregulator, condenser and decanter, were placed 134 parts of bishydroxyethyl taurine, 130 parts of neopentylglycol, 236 parts of azelaic acid, 186 parts of phthalic anhydride and 27 parts of xylene, and the mixture was heated.

The formed water was removed azeotropically off with xylene. The mixture was heated to 190° C. in about 2 hours from the commencement of reflux and the reaction was continued, while removing water, until the acid value (based on carboxylic acid) of 145. Thereafter, the reaction mixture was allowed to cool to 145° C. and at that temperature, 314 parts of Cardura E 10 (glycidyl ester of versatic acid, manufactured by Shell Chemicals) were added dropwise to the reaction mixture in 30 minutes.

After continuing stirring for 2 hours, the reaction was stopped to obtain a polyester resin solution (acid value 59, HO value 90, number average molecular weight 1054).

The quantity of organic characters was 1640 and the total quantity of inorganic characters was 1150. The resin had, as the group having the quantity of inorganic characters of 70 and more, $-SO_3H$,

and —OH groups, and as the group having the quantity of inorganic characters of less than 70, —COOR and aromatic ring (benzene).

Preparation of resinous particles

Into a 1 liter flask fitted with stirrer, condenser and thermoregulator, were placed 306 parts of deionized water, 30 parts of the abovesaid polyester resin and 3 parts of dimethyl ethanol amine, and the mixture was heated to 80° C. under stirring to dissolve the same.

To this, was added a mixture of 4.5 parts of azobiscyanovaleric acid, 45 parts of deionized water and 4.3 parts of dimethyl ethanol amine and next dropwise a mixture of 33 parts of methyl methacrylate, 84 parts of n-butyl acrylate, 63 parts of styrene, 30 parts of 2-hydroxyethyl acrylate and 60 parts of ethyleneglycol dimethacrylate in 60 minutes.

After completion of said addition, a mixture of 1.5 parts of azobiscyanovaleric acid, 15 parts of deionized water and 1.4 parts of dimethyl ethanolamine was added and the combined mixture was heated at 80° C. for 60 minutes under stirring to obtain an emulsion having a non-volatile content of 45%, pH of 7.4, viscosity (25° C.) of 110 cps. Mean diameter of the contained gel particles was 0.075 micron.

By the solvent substitution with xylene, a xylene dispersion was obtained, whose non-volatile content was 25%.

REFERENCE EXAMPLE 9

Preparation of Resinous Particles No.5

Into a 2 liter glass made reaction vessel fitted with stirrer, thermoregulator and condenser, were weighed 1100 parts of deionized water, which was then heated to 80° C. While maintaining stirring, an aqueous solution of 6 parts of ammonium persulfate in 100 parts of deionized water and 5 parts of monomer mixture, comprising 210 parts of methyl methacrylate, 75 parts of 2-ethyl hexyl acrylate and 15 parts of n-dodecyl mercaptane were added and the mixture was stirred for 5 minutes. Thereafter, the remaining 295 parts of the monomer mixture was dropped in the reaction mixture in 1 hour.

After completion of the said addition, the mixture was stirred for 15 minutes and an aqueous solution of 1 part of ammonium persulfate in 10 parts of deionized water was added and thereafter the combined mixture was stirred for 1 hour to complete the reaction. Thus, a seed emulsion (nonvolatile content 20%) was obtained.

Into the similar reaction vessel as used in the abovesaid seed emulsion, were placed 300 parts of deionized water and 25 parts of the abovesaid seed emulsion and the temperature was raised to 80° C. To this, was added an aqueous solution of 0.1 part of ammonium persulfate in 20 parts of deionized water under stirring and then a pre-emulsion comprising 335 parts of methyl methacrylate, 105 parts of 2-ethyl hexyl acrylate, 35 parts of 2-hydroxy ethyl acrylate, 25 parts of ethylene glycol dimethacrylate, 5 parts of n-dodecyl mercaptane, 200 parts of deionized water, 0.4 part of sodium dodecyl benzenesulfonate and 0.8 part of ammonium persulfate, was added dropwise in 2 hours. After completion of said addition, the mixture was stirred for 30 minutes and then added with an aqueous solution of 0.2 part of ammonium persulfate in 20 parts of deionized water and stirring was continued for 1 hour to complete the reaction.

The thus obtained emulsion had a non-volatile content of 48.5%, the mean diameter of the contained resinous particles being 0.7 micron, the maximum grain diameter being 1.4 micron. Number average molecular weight of the resin was 9800.

EXAMPLE 1

Into a 1 liter stainless steel beaker, were placed 200 parts of the acrylic resin varnish obtained in Reference Example 1, 25 parts of n-butanol modified melamine resin, 50 parts of the resinous particles obtained in Reference Example 5, and 2 parts of sorbitan lauric acid monoester and they were mixed well to obtain a resinous composition.

The thus obtained resinous composition was then applied onto a steel plate so as to give a dry thickness of 40 micron, and was baked at 150° C. for 30 minutes to obtain a dry coating. The cross-section of this film was examined by scanning electron microscope and a microdomain structure of about 0.8 micron size, irregular spherical aggregate of the resinous particles was observed.

The same procedures were repeated excepting omitting sorbitan lauric acid monoester and the dry coating was prepared.

Though there were no substantial differences in hardness between the coatings, the present one was far superior than the comparative coating in tensile strength and elongation.

|  | tensile strength (kg/cm$^2$) | elongation (%) |
|---|---|---|
| Example | 310 | 23 |
| Comparative Example | 261 | 12 |

Regarding sorbitan lauric acid monoester, the quantity of organic characters was 360 and the total quantity of inorganic characters was 380. This has, as the inorganic group having the quantity of inorganic characters of 70 and more, —OH, and as the group having the quantity of inorganic characters of less than 70, —COOR and 5-membered ring.

EXAMPLES 2 TO 11

The resinous compositions were prepared following the procedures of Example 1 with the following materials. In some of the Examples, melamine resin or polymaide resin is used as the second film-forming resin component for crosslinking purpose.

In the following table,

Epicort 1001 is the trade mark of epoxy resin (epoxy equivalent 450-500) manufactured by Shell Co., R-4576 varnish is the trade mark of urethane resin varnish (adduct of polyester polyol/MDI, non-volatile content 55%) manufactured by Nippon Paint Co.

Versamid-125 is the trade mark of polyamide resin (amine value 330-360) manufactured by Henkel-Hakusui Co.

ganic characters of 70 and more, amine salt, —OH and >NH.

Regarding ammonium lauryl sulfonate, the quantity of organic characters was 240 and the total quantity of inorganic characters was 400. As the group having the quantity of inorganic characters of 70 and more, this compound includes ammonium salt.

The same procedures were repeated excepting omitting the microdomain forming agent in the respective compositions and the dry coatings were prepared for comparison sake.

The present coatings were far superior than the comparative coatings in tensile strength and elongation.

REFERENCE EXAMPLE 2

The same procedures as stated in Example 2, a resinous composition and dried film were prepared except for substituting 1 part of lauryl alcohol. (R=240, $\Sigma$In=100, $\Sigma$In/R=0.4) for the modified epoxy resin. By electron microscope inspection, it were found that there was no microdomains and but rather separate resinous particles.

What is claimed is:

1. A composite film comprising a continuous phase of at least one resin and a discontinuous phase of microdomains, which are 0.03 to 10 microns in size and are aggregates of particles of at least one insoluble resin prepared by applying to a substrate a resinous composition consisting essentially of
   (a) a liquid medium

|  | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|
| Resin. varnish of Ref. Example |  |  |  |  |  |  |  |  |  |  |
| 1 |  |  |  | 200 |  |  |  | 200 |  |  |
| 2 | 140 |  |  |  | 140 |  |  |  |  |  |
| 3 |  | 200 |  |  |  | 200 |  |  |  |  |
| 4 |  |  | 200 |  |  |  | 200 |  |  |  |
| Epicoat 1001 |  |  |  |  |  |  |  |  | 125 |  |
| R-4576 varnish |  |  |  |  |  |  |  |  |  | 145 |
| Resin. particles of Ref. Example |  |  |  |  |  |  |  |  |  |  |
| 6 | 3 |  |  |  | 3 |  |  |  |  |  |
| 7 |  | 22 |  |  |  | 22 |  | 4 |  |  |
| 8 |  |  |  | 1 |  |  | 1 |  |  | 3 |
| 9 |  |  | 62 |  |  |  | 62 |  |  |  |
| Other film-forming resin |  |  |  |  |  |  |  |  |  |  |
| n-butanol modified melamine |  |  |  | 40 |  |  |  | 30 |  | 20 |
| hexamethoxymethylol melamine |  |  |  |  |  | 40 | 30 |  |  |  |
| Versamid-125 |  |  |  |  |  |  |  |  | 90 |  |
| Microdomain forming agent |  |  |  |  |  |  |  |  |  |  |
| modified epoxy resin of Ref. Ex. 7 |  | 0.1 |  |  |  | 0.1 |  |  | 0.5 |  |
| polyester resin of Ref. Ex. 8 | 1 |  |  | 1 |  |  |  |  |  | 0.5 |
| 2-(n-heptadecyl) amino ethane sulfonic acid neutralized with equimolar dimethyl ethanolamine |  |  | 10 |  |  |  | 10 |  |  |  |
| ammonium lauryl sulfonate |  |  |  |  | 0.05 |  |  |  | 0.05 |  |

The respective compositions were applied onto steel plates, forming coatings as in Example 1.

By the examination with scanning electron microscope, it was found that they were all of microdomain structures.

Regarding 2-(n-heptadecyl) aminoethane sulfonic acid neutralized with equimolar dimethyl ethanolamine, the quantity of organic characters was 460 and the total quantity of inorganic characters was 570. This compound has, as the group having the quantity of inor- (b) at least one resin which is soluble in said liquid medium and capable of forming a continuous phase in the film,
(c) particles of at least one resin which is insoluble in the combination of said (a) and said (b) and capable of forming a discontinuous microdomain phase in the film, and
(d) a microdomain forming agent which is an organic compound fulfilling the requirements $R \geq 160$ at least one $In \geq 70$ $\Sigma In/R \geq 0.5$ wherein R represents a quantity of organic characters, In is a quantity of inorganic characters of inorganic group No. n, and n is an integer of 1 and more and corresponds to the number of inorganic groups in the molecule, and drying, baking or both baking and drying.

* * * * *